(12) United States Patent
Nomura

(10) Patent No.: US 10,545,702 B2
(45) Date of Patent: Jan. 28, 2020

(54) INFORMATION PROCESSING APPARATUS, COMMUNICATION CONTROL METHOD AND COMMUNICATION SYSTEM

(71) Applicant: Oki Data Corporation, Tokyo (JP)

(72) Inventor: Jin Nomura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/252,761

(22) Filed: Jan. 21, 2019

(65) Prior Publication Data

US 2019/0235804 A1 Aug. 1, 2019

(30) Foreign Application Priority Data

Jan. 26, 2018 (JP) .................................. 2018-011129

(51) Int. Cl.
*G06F 3/12* (2006.01)

(52) U.S. Cl.
CPC .......... *G06F 3/1221* (2013.01); *G06F 3/1232* (2013.01); *G06F 3/1261* (2013.01); *G06F 3/1269* (2013.01)

(58) Field of Classification Search
CPC .... G06F 3/1221; G06F 3/1232; G06F 3/1261; G06F 3/1269
See application file for complete search history.

(56) References Cited

U.S. PATENT DOCUMENTS

| | | | | |
|---|---|---|---|---|
| 2005/0044430 A1* | 2/2005 | Cheshire | ............... | G06F 1/3209 713/300 |
| 2005/0111039 A1* | 5/2005 | Yoshida | ................ | G06F 3/1203 358/1.16 |
| 2006/0265473 A1* | 11/2006 | Muto | ..................... | G06F 1/3203 709/218 |
| 2010/0149581 A1* | 6/2010 | Shinto | ..................... | G06K 15/02 358/1.14 |
| 2010/0161819 A1* | 6/2010 | Ohara | ................... | G06F 3/1221 709/229 |
| 2014/0176984 A1* | 6/2014 | Nakayama | ......... | H04N 1/00891 358/1.14 |

FOREIGN PATENT DOCUMENTS

JP 2005-153199 A 6/2005

\* cited by examiner

*Primary Examiner* — Moustapha Diaby
(74) *Attorney, Agent, or Firm* — Muncy, Geissler, Olds & Lowe, P.C.

(57) ABSTRACT

An information processing apparatus has a release mode and a power saving mode with less power consumption, the information processing apparatus comprises: a communication part that communicates with a first information processing apparatus and a terminal apparatus; a storage part that stores first information which is information to be included in a response with respect to a command transmitted from the terminal apparatus by multicasting and received by the communication part; and a control part that sets a response function with respect to the command to either "valid" or "invalid" during the power saving mode. Wherein the control part transmits via the communication part the first information to the first information processing apparatus that performs a proxy response with respect to the command, and thereafter, sets the response function to "invalid" and executes a process to transit from the release mode to the power saving mode.

11 Claims, 14 Drawing Sheets

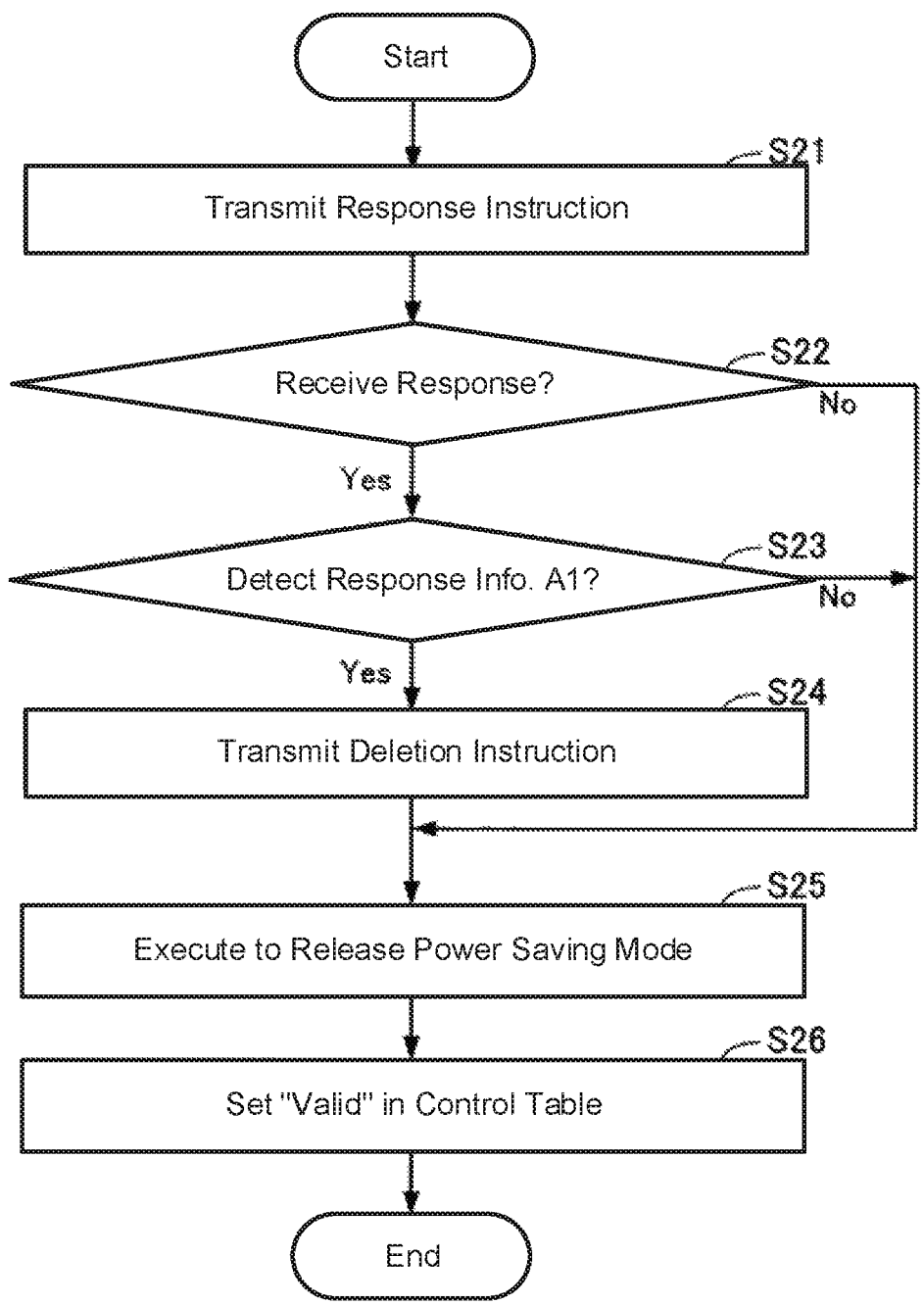

INFORMATION PROCESSING APPARATUS, COMMUNICATION CONTROL METHOD AND COMMUNICATION SYSTEM

TECHNICAL FIELD

The present invention relates to an information processing apparatus, a communication control method, and a communication system.

There is a system in which a plurality of apparatuses communicate with each other via a network. In this system, an apparatus that receives an inquiry from another apparatus responds to the inquiry (see Patent Document 1). For example, a printing apparatus of Patent Document 1 has a setting switch. When the setting switch is in an ON state, the printing apparatus responds to an inquiry transmitted by broadcasting (may be referred as multicasting) by a host apparatus.

RELATED ART

[Patent Document 1] Japanese Patent Laid-Open Application Publication No. 2005-153199.

On the other hand, in order to suppress power consumption, an apparatus having a power saving mode is known. In order to acquire information (for example, apparatus information) stored in the apparatus, a transmission instruction of the information may be transmitted by multicasting. When a transmission instruction is received in a state of the power saving mode, in order to respond to the transmission instruction, the apparatus releases the power saving mode, and transitions to a standby mode or the like, and responds. In the future, it is required to reduce the number of times when the power saving mode is released.

The present invention is intended to reduce the number of times when the power saving mode is released.

SUMMARY

An information processing apparatus, disclosed in the application, that performs in either one of two different power modes that are a power saving mode and a release mode, the release mode being a state to which the power saving mode turns by being released and in which power consumption of the information processing apparatus is higher than that in the power saving mode, the information processing apparatus comprises: a communication part that communicates with a first information processing apparatus, which is different from the information processing apparatus, and a terminal apparatus; a storage part that stores first information which is information to be included in a response with respect to a command transmitted from the terminal apparatus by multicasting and received by the communication part; and a control part that sets a response function with respect to the command to either "valid" or "invalid" during the power saving mode. Wherein the control part transmits via the communication part the first information to the first information processing apparatus that performs a proxy response with respect to the command, and thereafter, sets the response function to "invalid" and executes a process to transit from the release mode to the power saving mode.

According to the present invention, the number of times when the power saving mode is released can be reduced.

BRIEF DESCRIPTION OF THE DRAWINGS

FIG. 19 is a flow diagram illustrating a release process of the power saving mode.

DETAILED DESCRIPTION OF PREFERRED EMBODIMENT

In the following, an embodiment is described with reference to the drawings. The following embodiment is merely an example, and various modifications are possible within the scope of the present invention.

Embodiment

Figure 1:
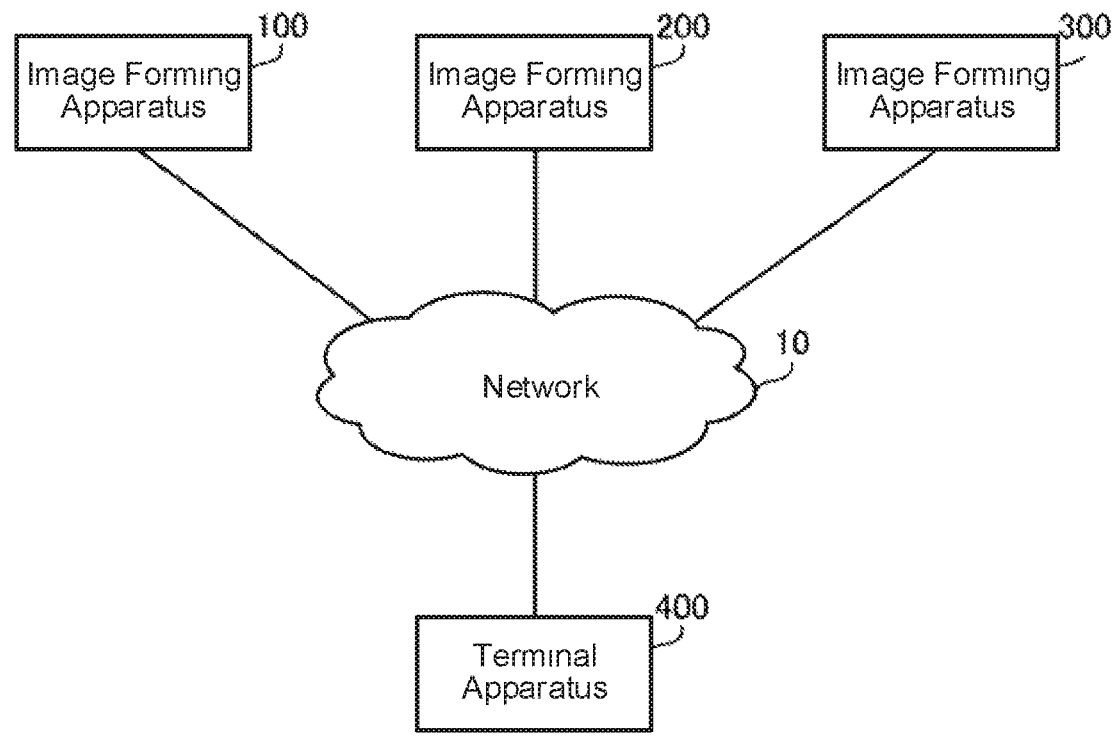
FIG. 1 illustrates a communication system.

FIG. 1 illustrates a communication system. The communication system includes image forming apparatuses 100, 200, 300. Further, the communication system may also include a terminal apparatus 400. The image forming apparatuses 100, 200, 300 and the terminal apparatus 400 are connected to each other via a network 10. For example, the network 10 is a LAN (Local Area Network) or a WAN (Wide Area Network).

The image forming apparatuses 100, 200, 300 are each, for example, a printer, a copying machine, a facsimile machine, a multifunction machine, or the like. The image forming apparatuses 100, 200, 300 are each an apparatus that executes a communication control method. The image forming apparatuses 100, 200, 300 are also each referred to as an information processing apparatus. An information processing apparatus may be an apparatus that does not have an image forming function. An information processing apparatus may be a computer. The image forming apparatus 100, the image forming apparatus 200, or the image forming apparatus 300 may be referred to as a first information processing apparatus or a second information processing apparatus.

The image forming apparatuses 100, 200, 300 are each in a release mode or a power saving mode. The release mode is a state in which the power saving mode is released, and is a state in which power consumption is higher than that in the power saving mode. For example, the release mode is a standby mode, an operation mode, or the like. The operation mode is a state in which a normal operation can be performed. The release mode may also be expressed as an operating state which is an operable state.

The power saving mode is a state in which power consumption is lower than that in the release mode. Further, the power saving mode is a state in which an operation is restricted by lowering power consumption. The terminal apparatus 400 is an apparatus that is used by a user. The terminal apparatus 400 transmits a command to the image forming apparatuses 100, 200, 300 by multicasting. For example, a command is a transmission instruction. For example, a transmission instruction is to instruct transmission of apparatus information stored by the image forming apparatuses 100, 200, 300. For example, the apparatus information includes apparatus names and IP (Internet Protocol) addresses of the image forming apparatuses 100, 200, 300.

In the following description, it is assumed that the terminal apparatus 400 transmits a transmission instruction to the image formation apparatuses 100, 200, 300 by multicasting. Further, whether or not the image forming apparatuses 100, 200, 300 respond to the transmission instruction will be described in detail later. With a conventional structure, the terminal apparatus is able to send another transmission instruction that is designated to a single image forming apparatus. The another transmission instruction may be referred as an individual transmission instruction, and such an instruction may be referred as to be transmitted by unicasting.

Figure 2:
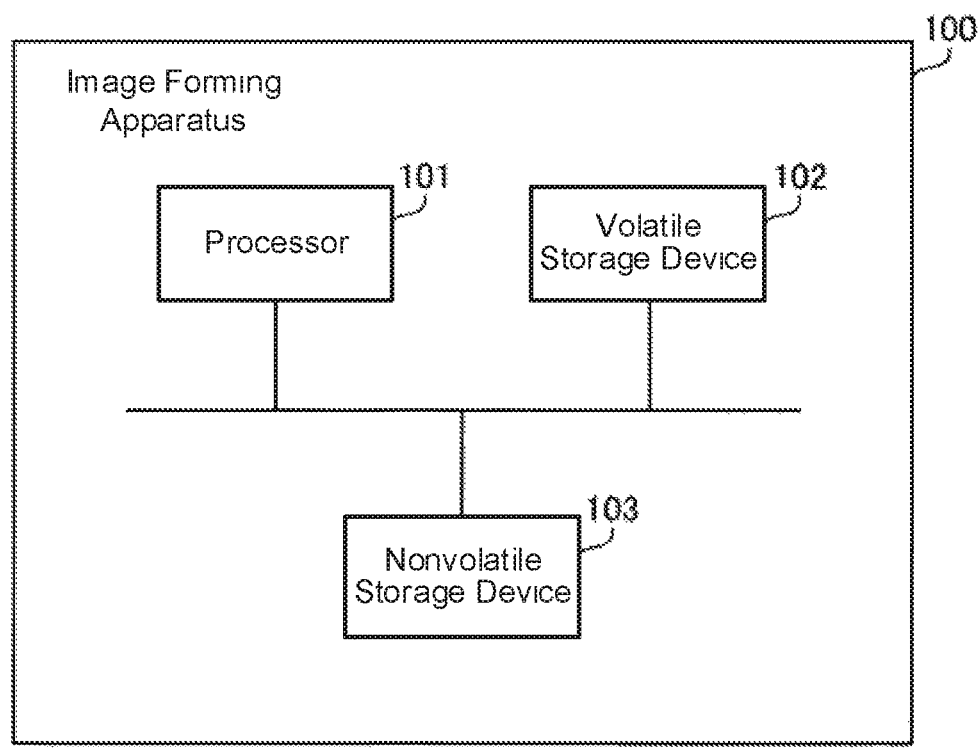
FIG. 2 illustrates a part of hardware of an image forming apparatus.

Next, a part of hardware of each of the image forming apparatuses 100, 200, 300 and the terminal apparatus 400 is described. FIG. 2 illustrates a part of the hardware of the image forming apparatus 100. The image forming apparatus 100 has a processor 101, a volatile storage device 102, and a nonvolatile storage device 103.

The processor 101 controls the entire image forming apparatus 100. For example, the processor 101 is a CPU (Central Processing Unit), an FPGA (Field Programmable Gate Array), or the like. The processor 101 may be a multi-processor. The image forming apparatus 100 may be realized by a processing circuit, or may be realized by software, firmware or a combination thereof The volatile storage device 102 is a main storage device of the image forming apparatus 100. For example, the volatile storage device 102 is a RAM (Random Access Memory). The nonvolatile storage device 103 is an auxiliary storage device of the image forming apparatus 100. For example, the nonvolatile storage device 103 is an SSD (Solid State Drive) or the like.

Similar to the image forming apparatus 100, the image forming apparatuses 200, 300 and the terminal apparatus 400 each have a processor, a volatile storage device, and a nonvolatile storage device. Here, a name of the image forming apparatus 100 is an image forming apparatus A. A name of the image forming apparatus 200 is an image forming apparatus B. A name of the image forming apparatus 300 is an image forming apparatus C.

Figure 3:
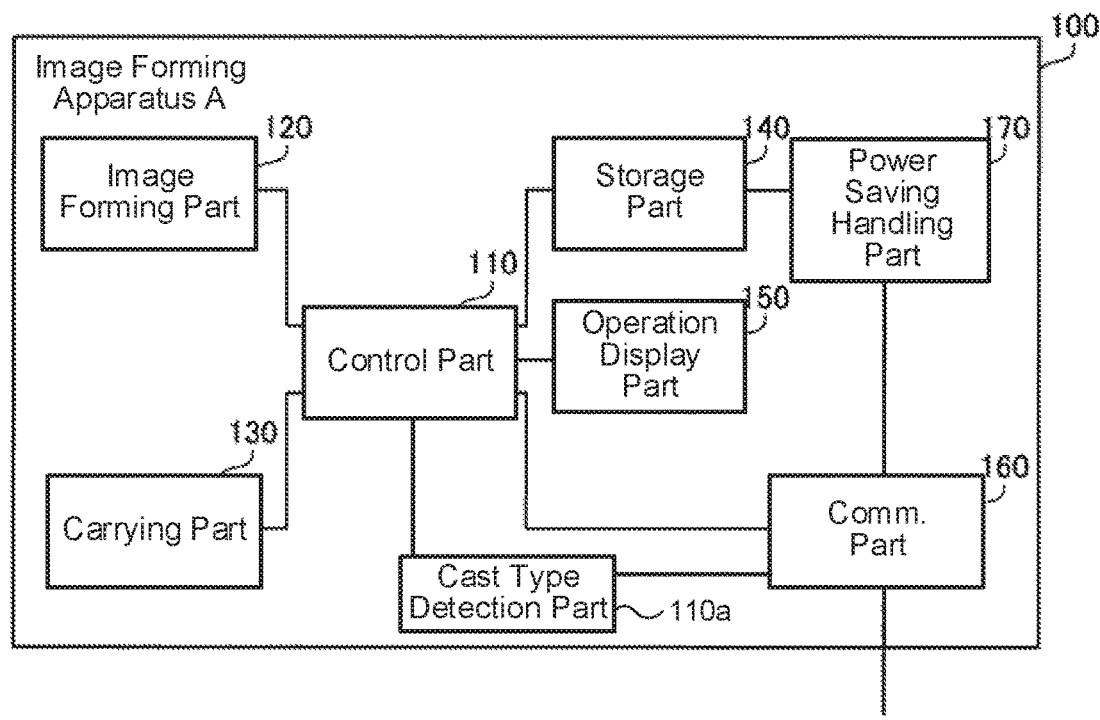
FIG. 3 is a functional block diagram illustrating a configuration of an image forming apparatus A.

FIG. 3 is a functional block diagram illustrating a configuration of the image forming apparatus A. The image forming apparatus 100 has a control part 110, an image forming part 120, a carrying part 130, a storage part 140, an operation display part 150, a communication part 160, and a power saving handling part 170. It is also possible that the control part 110, the operation display part 150, the communication part 160 (Comm. Part in FIG. 3), and the power saving handling part 170 are each partially or entirely realized by the processor 101. It is also possible that the control part 110, the operation display part 150, the communication part 160, and the power saving handling part 170 are each partially or entirely realized as a module of a communication control program executed by the processor 101. The program is stored in the volatile storage device 102 or the nonvolatile storage device 103.

The storage part 140 is realized as a storage area secured in the volatile storage device 102 or the nonvolatile storage device 103. The control part 110 controls the entire image forming apparatus 100. Functions of the control part 110 will be described in detail later.

The image forming part 120 forms an image on a print medium based on print data. The carrying part 130 carries a print medium accommodated in a medium accommodating part (not illustrated in the drawings) to the image forming part 120 and ejects the print medium on which an image is formed to outside of the image forming apparatus 100. The storage part 140 stores various pieces of information. The various pieces of information will be described in detail later. The operation display part 150 provides various pieces of information to an operator using the image forming apparatus 100. For example, the operation display part 150 displays information about an operation of the image forming apparatus 100 on a display.

The communication part 160 communicates with the image forming apparatuses 200, 300 and the terminal apparatus 400 via the network 10. The power saving handling part 170 receives power supply from a battery or the like when the image forming apparatus 100 is in the power saving mode. Further, the storage part 140 and the communication part 160 receive power supply from a battery or the like when the image forming apparatus 100 is in the power saving mode. The control part 110, the image forming part 120, the carrying part 130, and the operation display part 150 do not receive power from a battery or the like when the image forming apparatus 100 is in the power saving mode. That is, power supplied to the control part 110, the image forming part 120, the carrying part 130, and the operation display part 150 is stopped. As a result, the image forming apparatus 100 can suppress power consumption.

In this embodiment, the power saving mode means either that one of control part 110 and operation display part 150 does not receive a power supply or that none of these parts (110 and 150) does not receive a power supply. Compared with the release mode, the image forming apparatus may use only 20% power. In the light of the present invention, the power saving mode may consume a power that is ranged from 10 to 25% related to that of the release mode. Putting it simply, the power saving mode can be defined as a mode under which the image forming apparatus consumes 50% or less power than the release mode.

The power saving handling part 170 does not receive power supply when the image forming apparatus 100 is in the release mode. The control part 110, the image forming part 120, the carrying part 130, the storage part 140, the operation display part 150, and the communication part 160 receive power supply when the image forming apparatus 100 is in the release mode. Functions of the power saving handling part 170 will be described in detail later.

Figure 4:
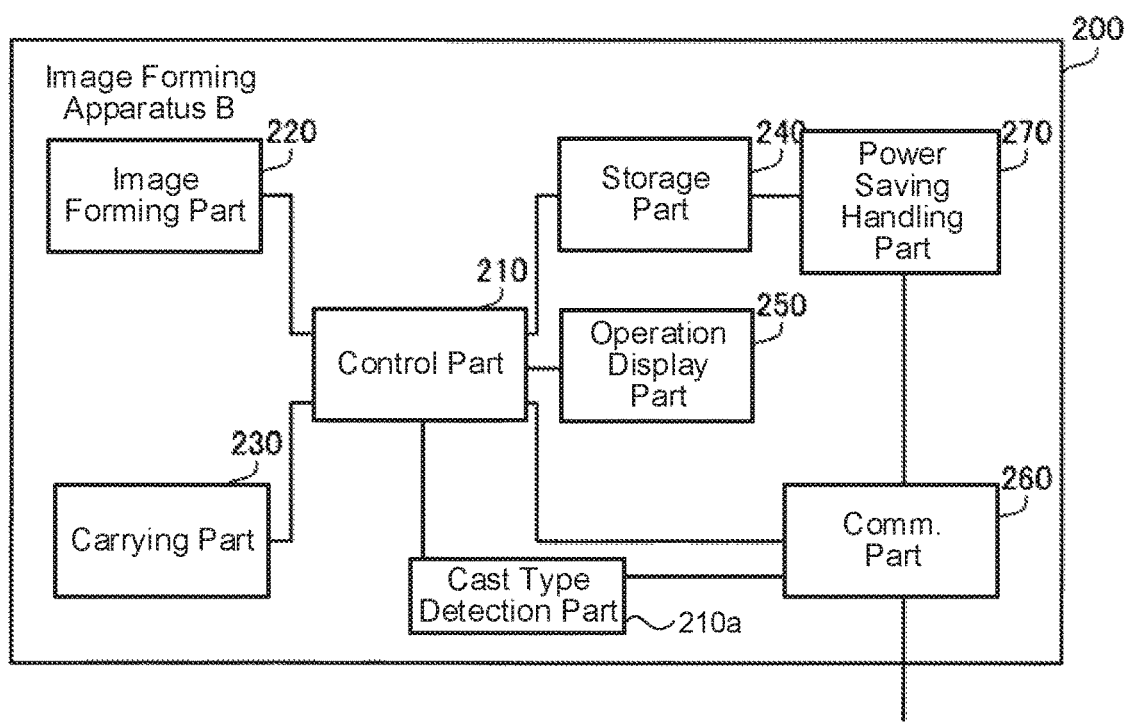
FIG. 4 is a functional block diagram illustrating a configuration of an image forming apparatus B.

FIG. 4 is a functional block diagram illustrating a configuration of the image forming apparatus B. The image forming apparatus 200 has a control part 210, an image forming part 220, a carrying part 230, a storage part 240, an operation display part 250, a communication part 260, and a power saving handling part 270.

It is also possible that the control part 210, the operation display part 250, the communication part 260, and the power saving handling part 270 are each partially or entirely realized by a processor of the image forming apparatus 200. It is also possible that the control part 210, the operation display part 250, the communication part 260, and the power saving handling part 270 are each partially or entirely realized as a module of a communication control program executed by the processor of the image forming apparatus 200. The program is stored in a volatile storage device or a nonvolatile storage device of the image forming apparatus 200. The storage part 240 is realized as a storage area secured in the volatile storage device or the nonvolatile storage device of the image forming apparatus 200.

Functions of the control part 210, the image forming part 220, the carrying part 230, the operation display part 250, the communication part 260, and the power saving handling part 270 are respectively the same as the functions of the control part 110, the image forming part 120, the carrying part 130, the operation display part 150, communication part 160, and the power saving handling part 170, and thus, descriptions thereof are omitted. Further, power supply destinations in the power saving mode and the release mode are the same between the image forming apparatus 100 and the image forming apparatus 200.

Figure 5:
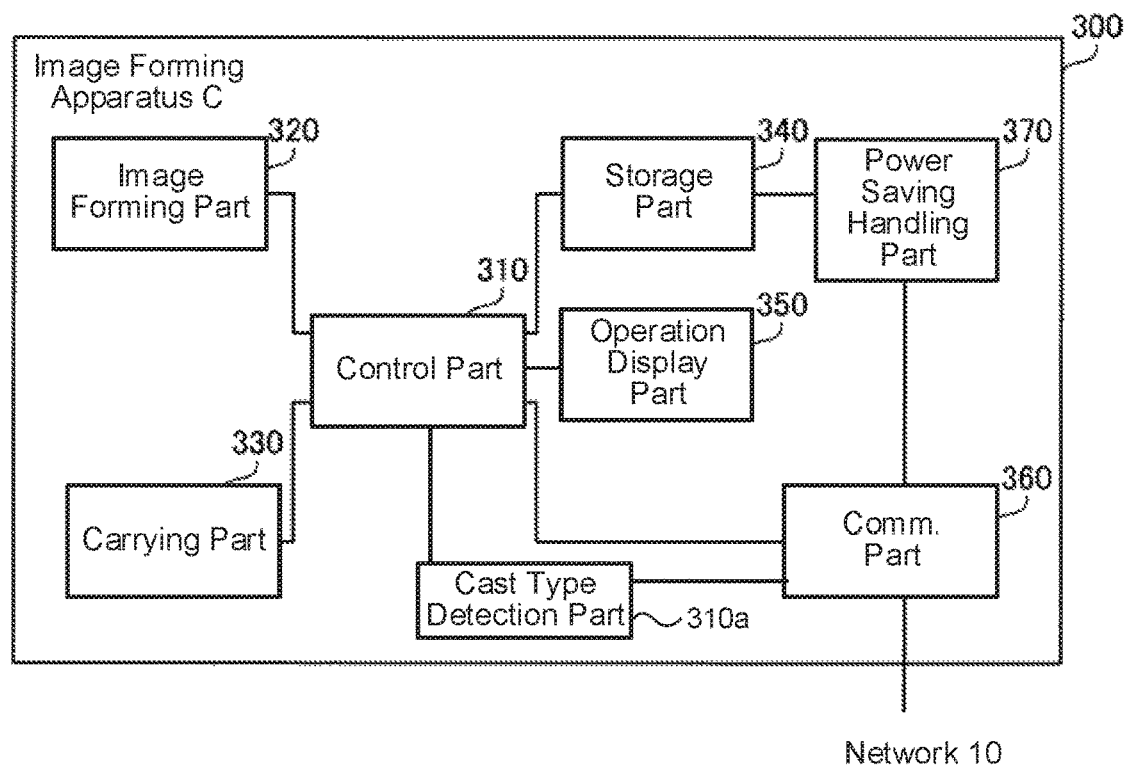
FIG. 5 is a functional block diagram illustrating a configuration of an image forming apparatus C.

FIG. 5 is a functional block diagram illustrating a configuration of the image forming apparatus C. The image forming apparatus 300 has a control part 310, an image forming part 320, a carrying part 330, a storage part 340, an operation display part 350, a communication part 360, and a power saving handling part 370.

It is also possible that the control part 310, the operation display part 350, the communication part 360, and the power saving handling part 370 are each partially or entirely realized by a processor of the image forming apparatus 300. It is also possible that the control part 310, the operation display part 350, the communication part 360, and the power saving handling part 370 are each partially or entirely realized as a module of a communication control program executed by the processor of the image forming apparatus 300. The program is stored in a volatile storage device or a nonvolatile storage device of the image forming apparatus 300. The storage part 340 is realized as a storage area secured in the volatile storage device or the nonvolatile storage device of the image forming apparatus 300.

Functions of the control part 310, the image forming part 320, the carrying part 330, the operation display part 350, the communication part 360, and the power saving handling part 370 are respectively the same as the functions of the control part 110, the image forming part 120, the carrying part 130, the operation display part 150, communication part 160, and the power saving handling part 170, and thus, descriptions thereof are omitted. Further, the power supply destinations in the power saving mode and the release mode are the same between the image forming apparatus 100 and the image forming apparatus 300.

Figure 6:
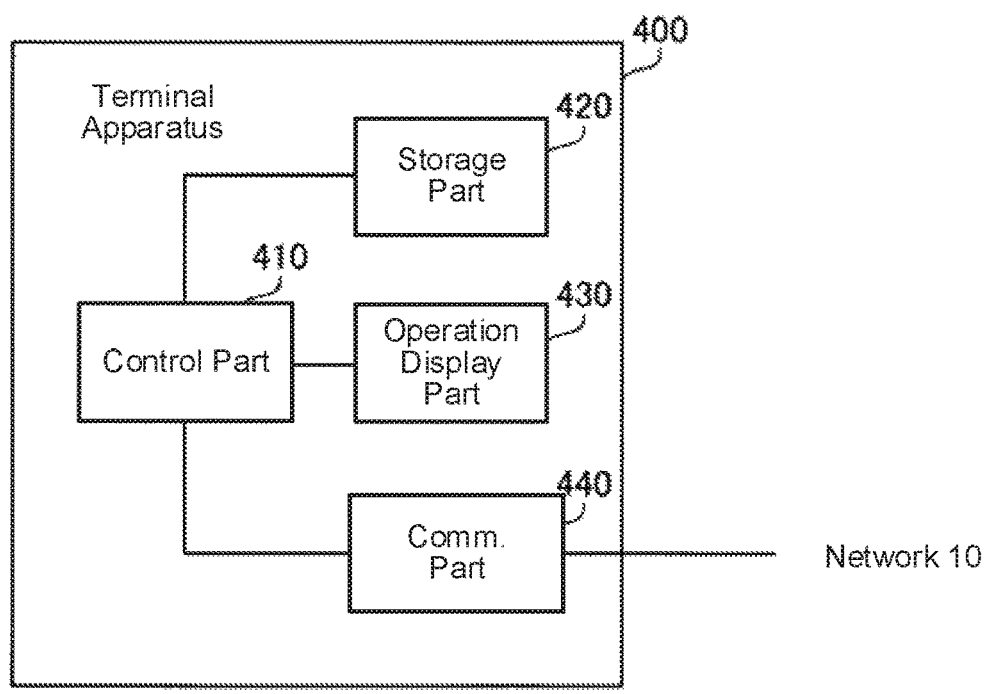
FIG. 6 is a functional block diagram illustrating a configuration of a terminal apparatus.

FIG. 6 is a functional block diagram illustrating a configuration of the terminal apparatus. The terminal apparatus 400 has a control part 410, a storage part 420, an operation display part 430, and a communication part 440. The control part 410 controls the entire terminal apparatus 400. The storage part 420 stores information used for processing executed by the control part 410. The operation display part 430 displays on a display of the terminal apparatus 400 various pieces of information to a user using the terminal apparatus 400. The communication part 440 communicates with the image forming apparatuses 100, 200, 300 via the network 10.

Figure 7:
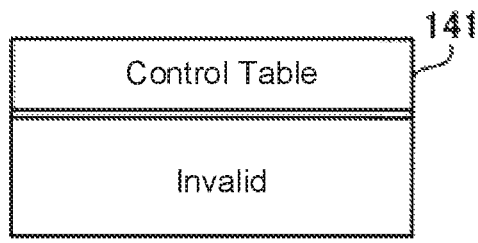
FIG. 7 illustrates an example of a control table.

FIG. 7 illustrates an example of a control table. A control table 141 is also referred to as control information. The control table 141 is stored in the storage part 140. Further, the storage part 240 and the storage part 340 each similarly store a control table.

"Valid" or "invalid" is set in the control table 141. "Valid" indicates to respond to a command transmitted by multicasting. "Invalid" indicates not to respond to a command transmitted by multicasting. Therefore, when "valid" is set in the control table 141, the image forming apparatus 100 responds to a command transmitted by multicasting. Further, when "invalid" is set in the control table 141, the image forming apparatus 100 does not respond to a command transmitted by multicasting.

Here, in the power saving mode, the control part 110 sets a response function with respect to a transmission instruction transmitted by the terminal apparatus 400 to "valid" or "invalid." This is described in detail below. In the power saving mode, in a case of responding to a transmission instruction transmitted by the terminal apparatus 400, the control part 110 sets "valid" in the control table 141. In the power saving mode, in a case of not responding to a transmission instruction transmitted by the terminal apparatus 400, the control part 110 sets "invalid" in the control table 141.

Figure 8:
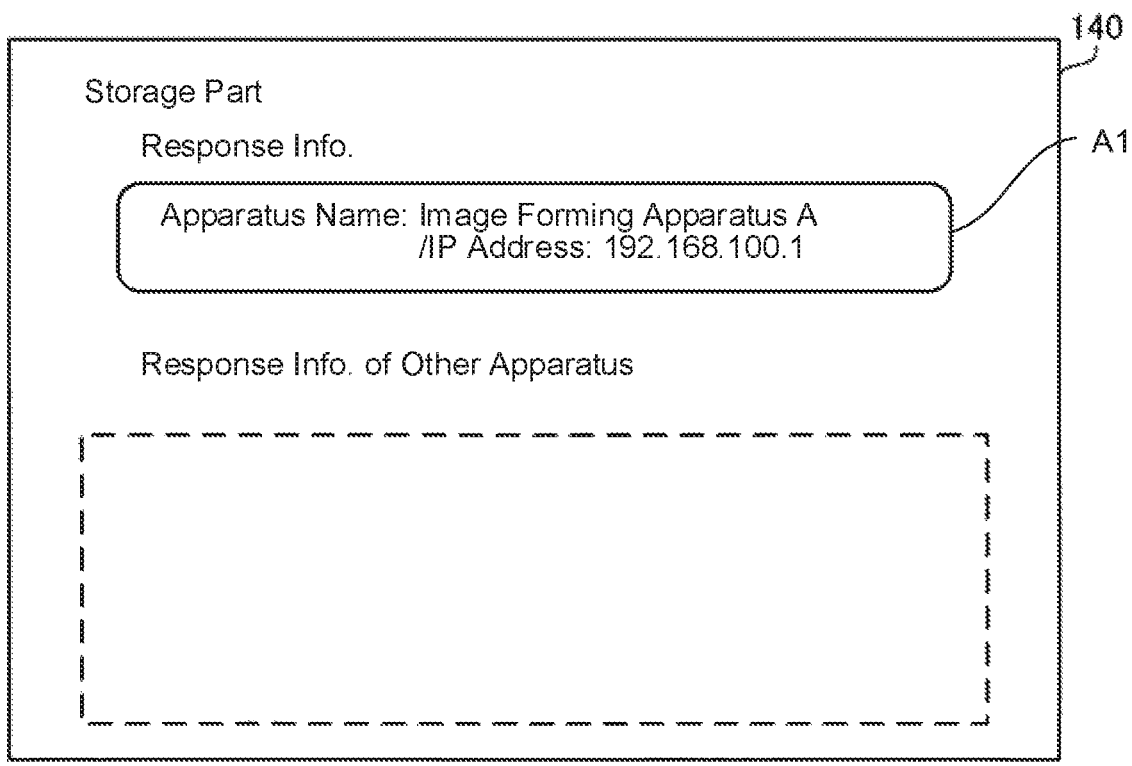
FIG. 8 illustrates a specific example of a storage part of the image forming apparatus A.

FIG. 8 illustrates a specific example of the storage part of the image forming apparatus A. The storage part 140 stores response information. The response information is information to be included in a response with respect to a transmission instruction received by the communication part 160 and transmitted by multicasting by the terminal apparatus 400. Further, the response information may also be expressed as information required for a response to a transmission instruction transmitted by the terminal apparatus 400. Further, the response information may also be expressed as multicasting response information.

The response information includes an apparatus name and an IP address. That is, the response information is apparatus information. For example, the apparatus name included in the response information is an apparatus name of the image forming apparatus 100. The IP address is an IP address "192.168.100.1" assigned to the image forming apparatus 100. The response information may include information other than the apparatus name and the IP address. In the following, the response information including the apparatus name of the image forming apparatus 100 and the IP address assigned to the image forming apparatus 100 is referred to as response information A1. Here, the apparatus information or response information specifying its own information processing apparatus is referred to as first information. The storage part 140 may also store response information of other apparatuses.

Figure 9:
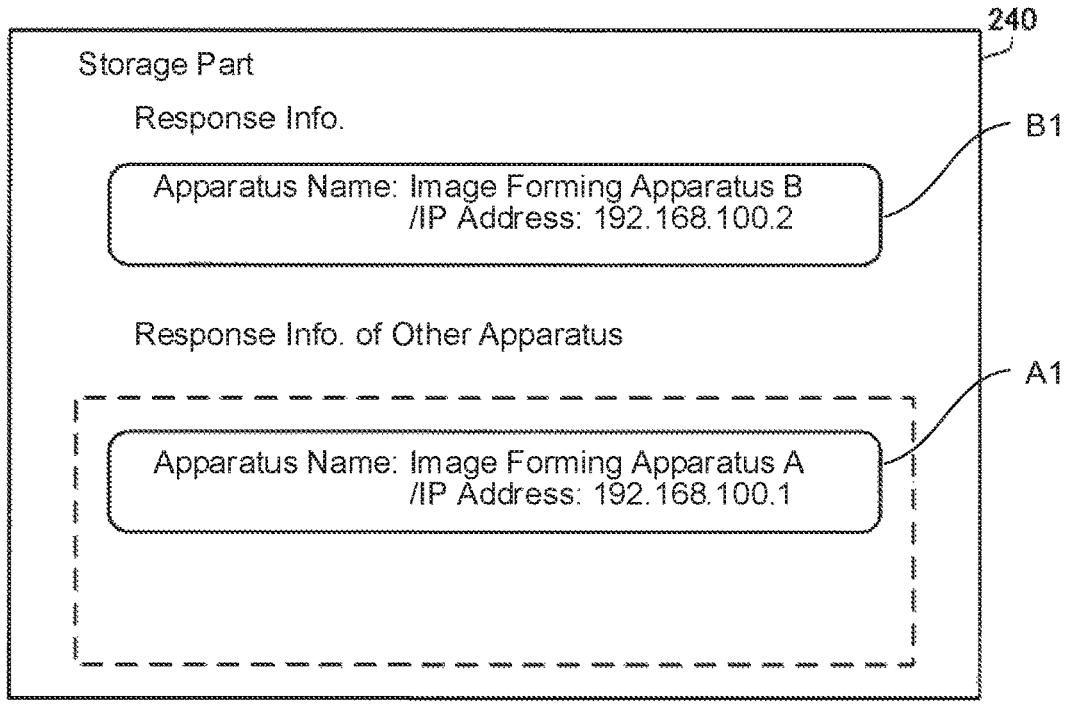
FIG. 9 illustrates a specific example of a storage part of the image forming apparatus B.

FIG. 9 illustrates a specific example of the storage part of the image forming apparatus B. The storage part 240 stores response information. The response information includes an apparatus name and an IP address. For example, the apparatus name is an apparatus name of the image forming apparatus 200. The IP address is an IP address "192.168.100.2" assigned to the image forming apparatus 200. The response information may include information other than the apparatus name and the IP address. In the following, the response information including the apparatus name of the image forming apparatus 200 and the IP address assigned to the image forming apparatus 200 is referred to as response information B1.

The storage part 240 can also store response information of other apparatuses. FIG. 9 illustrates a state in which the response information A1 is stored in the storage part 240. In what situation the response information A1 is stored in the storage part 240 will be described in detail later.

Figure 10:
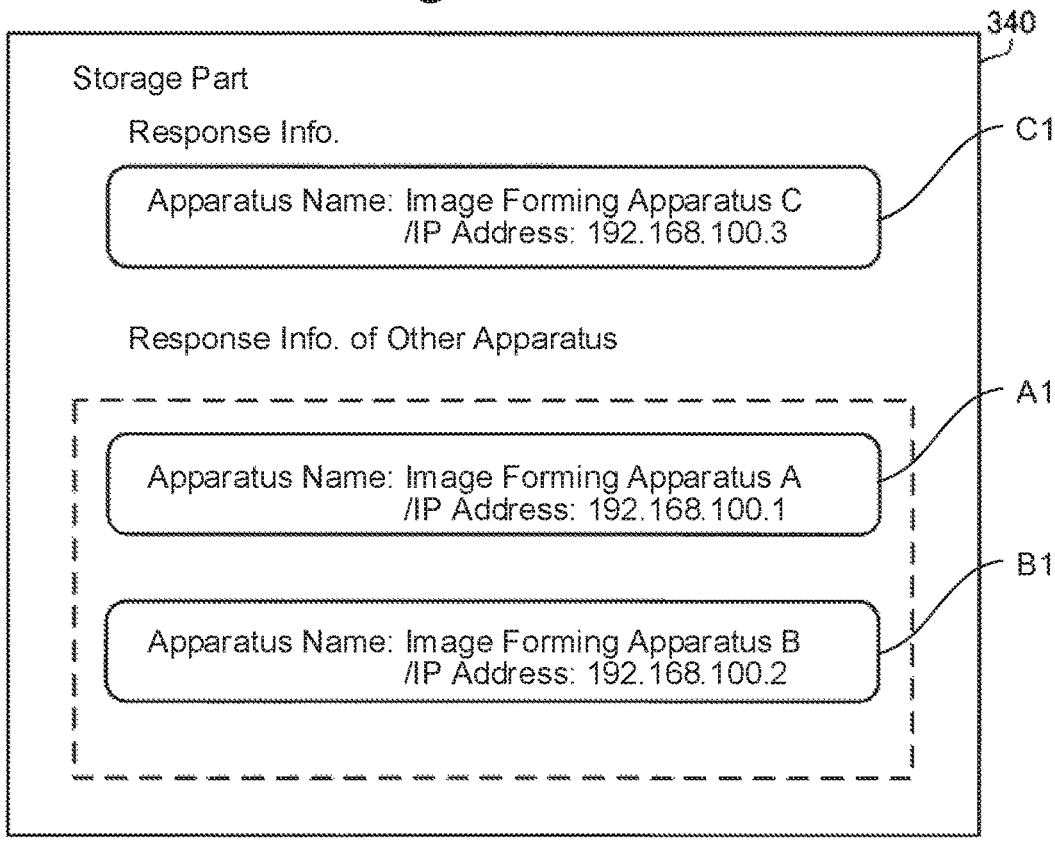
FIG. 10 illustrates a specific example of a storage part of the image forming apparatus C.

FIG. 10 illustrates a specific example of the storage part of the image forming apparatus C. The storage part 340 stores response information. The response information includes an apparatus name and an IP address. For example, the apparatus name is an apparatus name of the image forming apparatus 300. The IP address is an IP address "192.168.100.3" assigned to the image forming apparatus 300. The response information may include information other than the apparatus name and the IP address. In the following, the response information including the apparatus name of the image forming apparatus 300 and the IP address assigned to the image forming apparatus 300 is referred to as response information C1.

The storage part 340 can also store response information of other apparatuses. FIG. 10 illustrates a state in which the response information A1 and the response information B1 are stored in the storage part 340. In what situation the response information A1 and the response information B1 are stored in the storage part 340 will be described in detail later.

Figure 11:
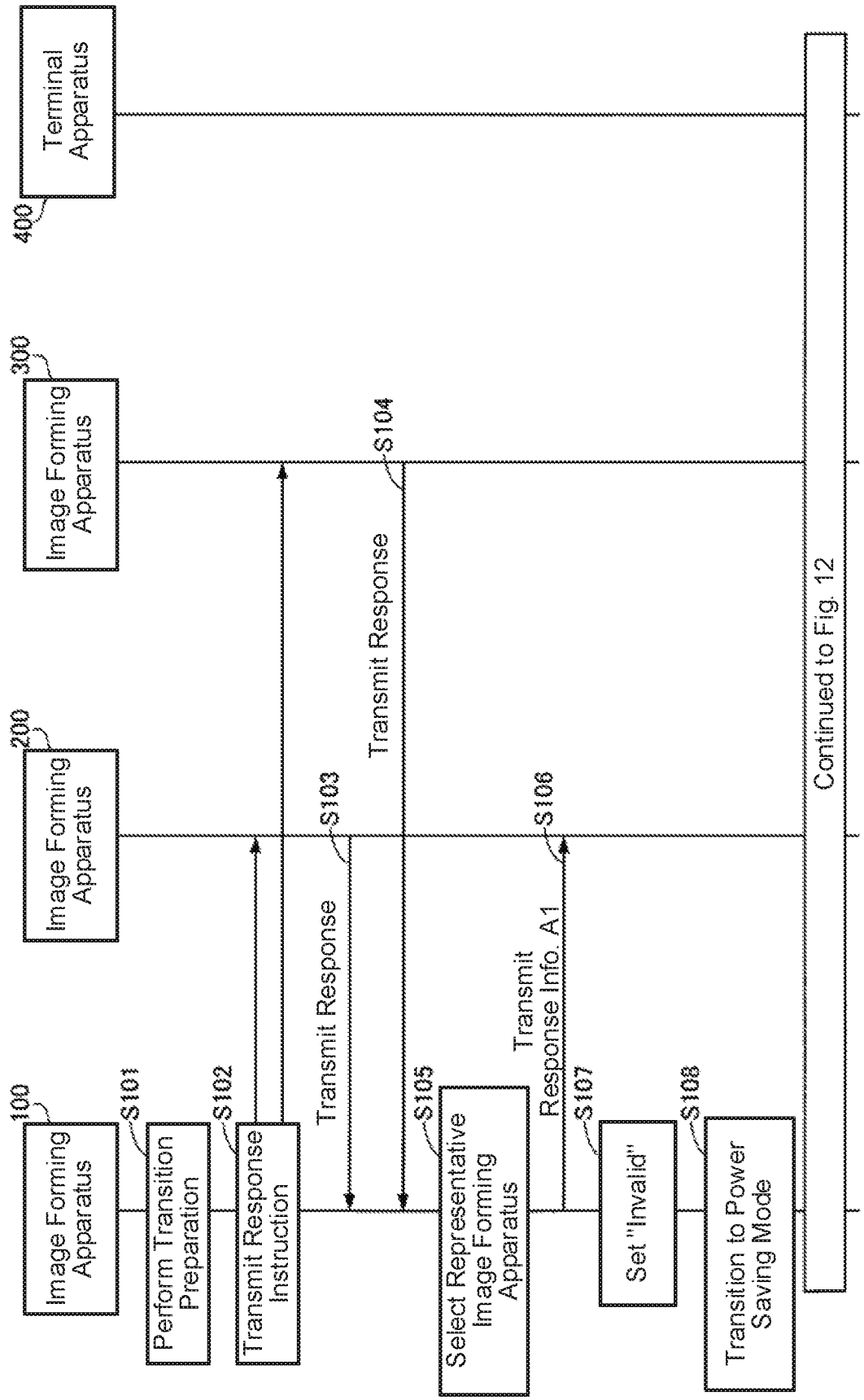
FIG. 11 is a part 1 of a sequence diagram illustrating an example of a transition process to a power saving mode.

Next, communication processes performed between the image forming apparatuses 100, 200, 300, and the terminal apparatus 400 are described using sequence diagrams. FIG. 11 is a part 1 of a sequence diagram illustrating an example of a transition process to the power saving mode. In the description of FIGS. 11-14, FIGS. 1, 3-5 and 7-10 are referenced. Further, it is assumed that the image forming apparatuses 100, 200, 300 are in the release mode. Further, it is assumed that "valid" is set in the control tables of the image forming apparatuses 100, 200, 300.

(Step S101) The control part 110 of the image forming apparatus 100 performs transition preparation in order to transition to the power saving mode.

(Step S102) The control part 110 of the image forming apparatus 100 transmits via the communication part 160 a response instruction by multicasting. The response instruction instructs a response. A multicast address is set for a destination address included in the response instruction. For example, the multicast address is a multicast address previously set as a destination address included in a command transmitted by multicasting by the terminal apparatus 400. In this way, the communication part 160 transmits the response instruction to the image forming apparatuses 200, 300 belonging to a multicast group.

(Step S103) The control part 210 of the image forming apparatus 200 refers to the control table stored in the storage part 240 and detects that "valid" is set. The communication part 260 of the image forming apparatus 200 transmits a response with respect to the response instruction to the image forming apparatus 100. The IP address "192.168.100.2" is included in the response.

(Step S104) The control part 310 of the image forming apparatus 300 refers to the control table stored in the storage part 340 and detects that "valid" is set. The communication part 360 of the image forming apparatus 300 transmits a response with respect to the response instruction to the image forming apparatus 100. The IP address "192.168.100.3" is included in the response.

(Step S105) The control part 110 of the image forming apparatus 100 selects a representative image forming apparatus from the image forming apparatuses that responded with respect to the response instruction. In FIG. 11, it is assumed that the control part 110 of the image forming apparatus 100 has selected the image forming apparatus 200. That is because the image forming apparatus 200 made a response earlier than others. Here, the representative image forming apparatus is also referred to as a first information processing apparatus. Further, the representative image forming apparatus is an apparatus that performs a proxy response with respect to a transmission instruction transmitted by the terminal apparatus 400.

(Step S106) The control part 110 of the image forming apparatus 100 transmits via the communication part 160 the response information A1 stored in the storage part 140 to the image forming apparatus 200. That is, the control part 110 of the image forming apparatus 100 transmits via the communication part 160 the response information A1 to the image forming apparatus 200 that performs a proxy response with respect to a transmission instruction transmitted by the terminal apparatus 400. As a result, the response information A1 is stored in the storage part 240 of the image forming apparatus 200. FIG. 9 illustrates a state in which the response information A1 is stored in the storage part 240.

(Step S107) The control part 110 of the image forming apparatus 100 sets the response function to "invalid." That is, the control part 110 of the image forming apparatus 100 sets "invalid" in the control table 141. As a result, the image forming apparatus 100 stops responding to a command transmitted by multicasting.

(Step S108) The control part 110 of the image forming apparatus 100 executes a process to transition from the release mode to the power saving mode. For example, the control part 110 instructs a power supply circuit (not illustrated in the drawings) of the image forming apparatus 100 to change the power supply destination to the storage part 140, the communication part 160 and the power saving handling part 170. As a result, power is not supplied to the control part 110 and the like. Then, the image formation apparatus 100 transitions to the power saving mode.

Figure 12:
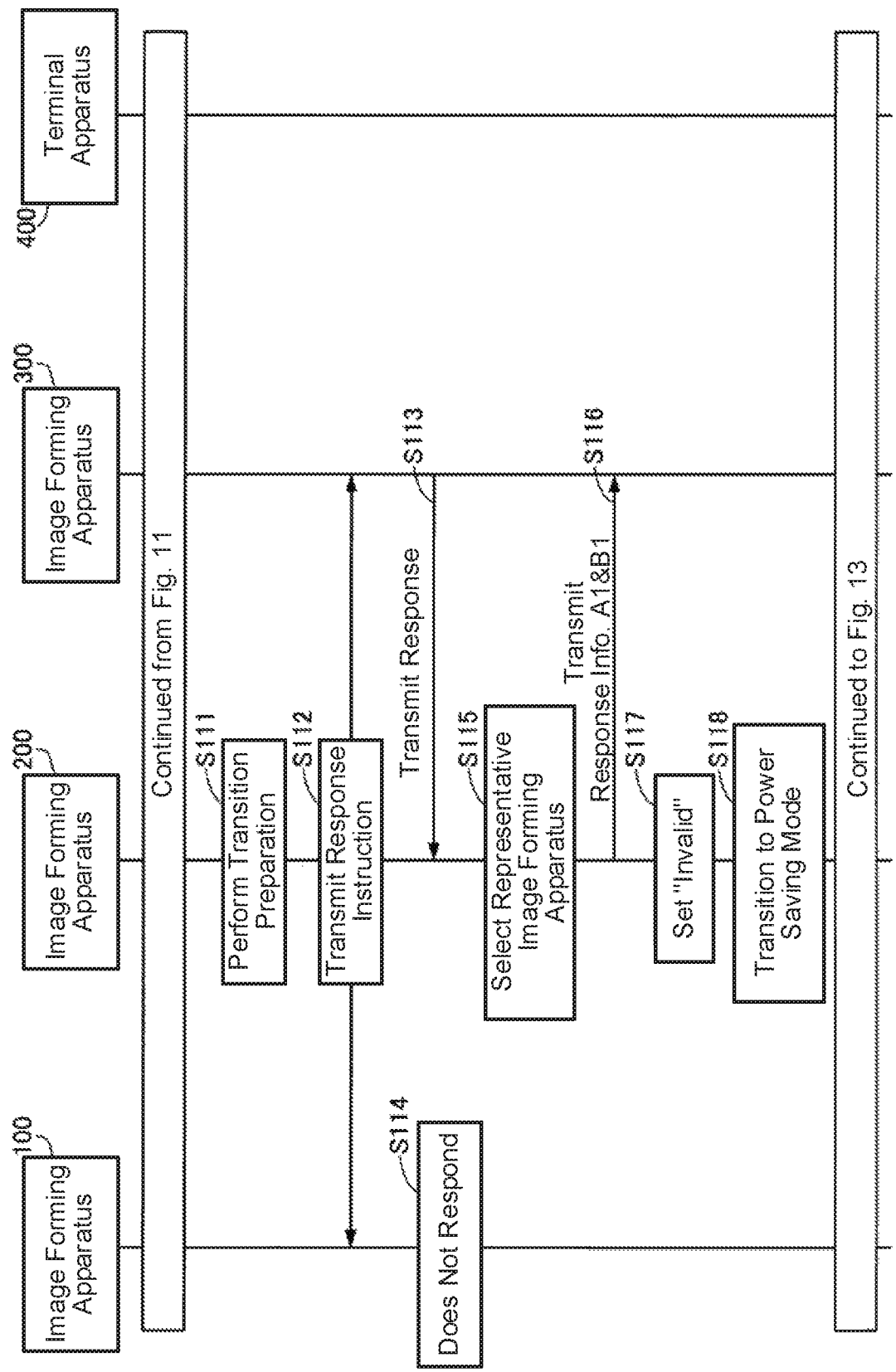
FIG. 12 is a part 2 of the sequence diagram illustrating the example of the transition process to the power saving mode.

FIG. 12 is a part 2 of the sequence diagram illustrating the example of the transition process to the power saving mode.

(Step S111) The control part 210 of the image forming apparatus 200 performs transition preparation in order to transition to the power saving mode.

(Step S112) The control part 210 of the image forming apparatus 200 transmits via the communication part 260 a response instruction by multicasting. A multicast address is set for a destination address included in the response instruction. For example, the multicast address is a multicast address previously set as a destination address included in information transmitted by multicasting by the terminal apparatus 400.

(Step S113) The control part 310 of the image forming apparatus 300 refers to the control table stored in the storage part 340 and detects that "valid" is set. The communication part 360 of the image forming apparatus 300 transmits a response with respect to the response instruction. The IP address "192.168.100.3" is included in the response.

(Step S114) The power saving handling part 170 of the image forming apparatus 100 receives the response instruction via the communication part 160. The power saving handling part 170 of the image forming apparatus 100 refers to the control table 141 and detects that "invalid" is set. Therefore, the power saving handling part 170 of the image forming apparatus 100 does not respond to the response instruction. Further, the power saving handling part 170 of the image forming apparatus 100 does not release the power saving mode. In this way, when the image forming apparatus 100 is in the power saving mode and "invalid" is set in the control table 141, the image forming apparatus 100 does not release the power saving mode. Further, the power saving handling part 170 of the image forming apparatus 100 may discard the response instruction (that is, the command).

(Step S115) The control part 210 of the image forming apparatus 200 selects a representative image forming apparatus from the image forming apparatuses that responded with respect to the response instruction. That is, the control part 210 of the image forming apparatus 200 selects the image forming apparatus 300. As described above, the image forming apparatus 300 selected as the representative image forming apparatus is also referred to as a first information processing apparatus.

(Step S116) The control part 210 of the image forming apparatus 200 transmits via the communication part 260 the response information A1 and the response information B1 to the image forming apparatus 300. That is, the control part 210 of the image forming apparatus 200 transmits the response information A1 and the response information B1 to the image forming apparatus 300 that performs a proxy response with respect to a transmission instruction transmitted by the terminal apparatus 400. As a result, the response information A1 and the response information B1 are stored in the storage part 340 of the image forming apparatus 300. FIG. 10 illustrates a state in which the response information A1 and the response information B1 are stored in the storage part 340.

(Step S117) The control part 210 of the image forming apparatus 200 sets the response function to "invalid." That is, the control part 210 of the image forming apparatus 200 sets "invalid" in the control table stored in the storage part 240. As a result, the image forming apparatus 200 stops responding to a command transmitted by multicasting.

(Step S118) The control part 210 of the image forming apparatus 200 executes a process to transition to the power saving mode. As a result, the image formation apparatus 200 transitions to the power saving mode.

Figure 13:
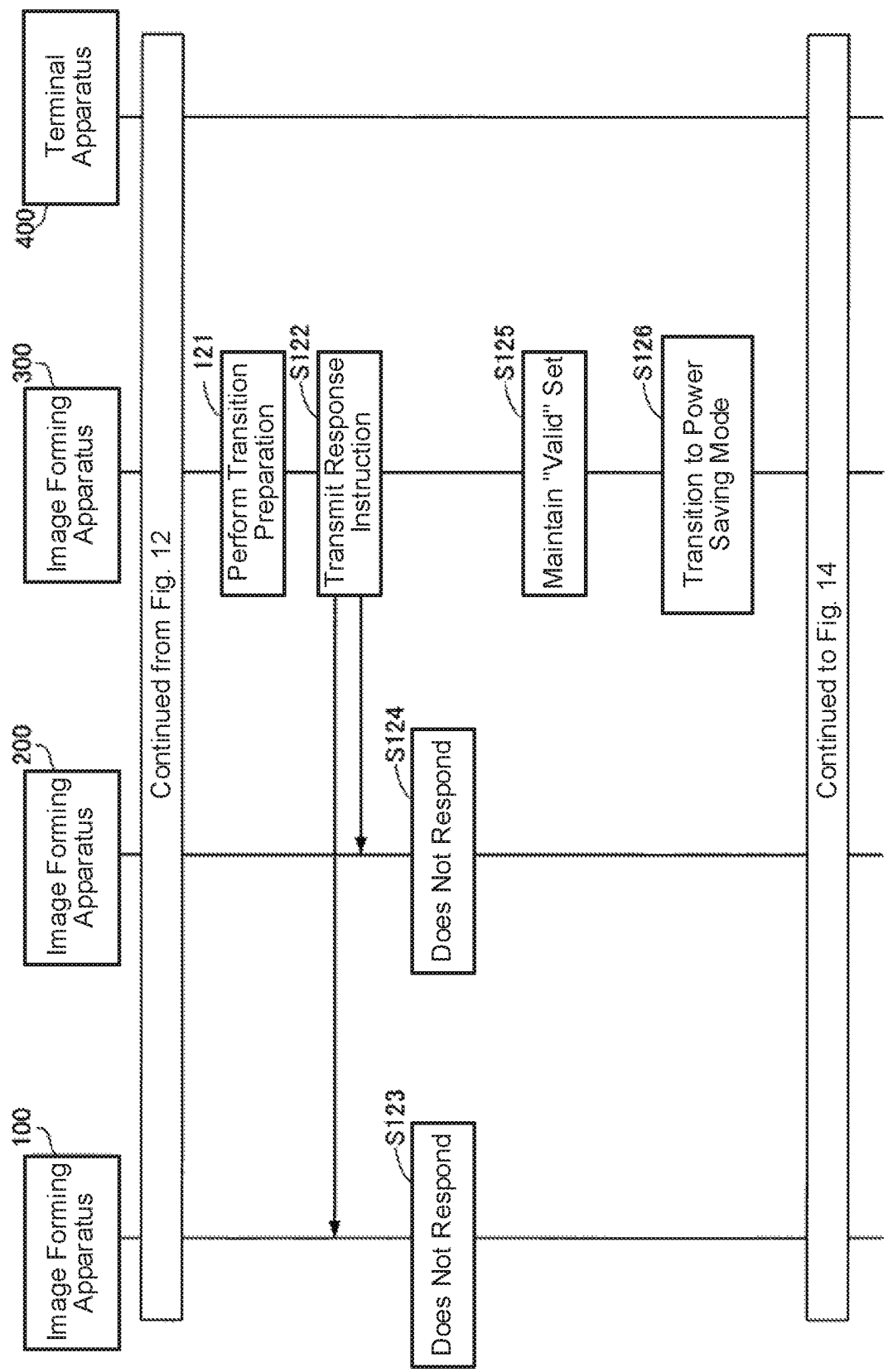
FIG. 13 is a part 3 of the sequence diagram illustrating the example of the transition process to the power saving mode.

FIG. 13 is a part 3 of the sequence diagram illustrating the example of the transition process to the power saving mode.

(Step S121) The control part 310 of the image forming apparatus 300 performs transition preparation in order to transition to the power saving mode.

(Step S122) The control part 310 of the image forming apparatus 300 transmits via the communication part 360 a response instruction by multicasting. A multicast address is set for a destination address included in the response instruction. For example, the multicast address is a multicast address previously set as a destination address included in information transmitted by multicasting by the terminal apparatus 400.

(Step S123) The power saving handling part 170 of the image forming apparatus 100 refers to the control table 141 and detects that "invalid" is set. Therefore, the power saving handling part 170 of the image forming apparatus 100 does not respond to the response instruction. Further, the power saving handling part 170 of the image forming apparatus 100 does not release the power saving mode.

(Step S124) The power saving handling part 270 of the image forming apparatus 200 refers to the control table stored in the storage part 240 and detects that "invalid" is set. Therefore, the power saving handling part 270 of the image forming apparatus 200 does not respond to the response instruction. Further, the power saving handling part 270 of the image forming apparatus 200 does not release the power saving mode. In this way, when the image forming apparatus 200 is in the power saving mode and "invalid" is set in the control table stored in the storage part 240, the image forming apparatus 200 does not release the power saving mode.

(Step S125) The control part 310 of the image forming apparatus 300 maintains "valid" set in the control table stored in the storage part 340.

(Step S126) The control part 310 of the image forming apparatus 300 executes a process to transition to the power saving mode. As a result, the image formation apparatus 300 transitions to the power saving mode. In this way, when there is no response with respect to the response instruction, the control part 310 executes a process to transition from the release mode to the power saving mode while the response function remains being set to "valid."

Considering working circumstances, the control part 310 varies the waiting period to determine that there is no response. It may be 1 second or 5 minutes or more. In the embodiment, the period is 20 seconds. It may be practical for the waiting period to be ranged between 5 seconds and 60 seconds, and preferably between 10 seconds to 30 seconds.

Figure 14:
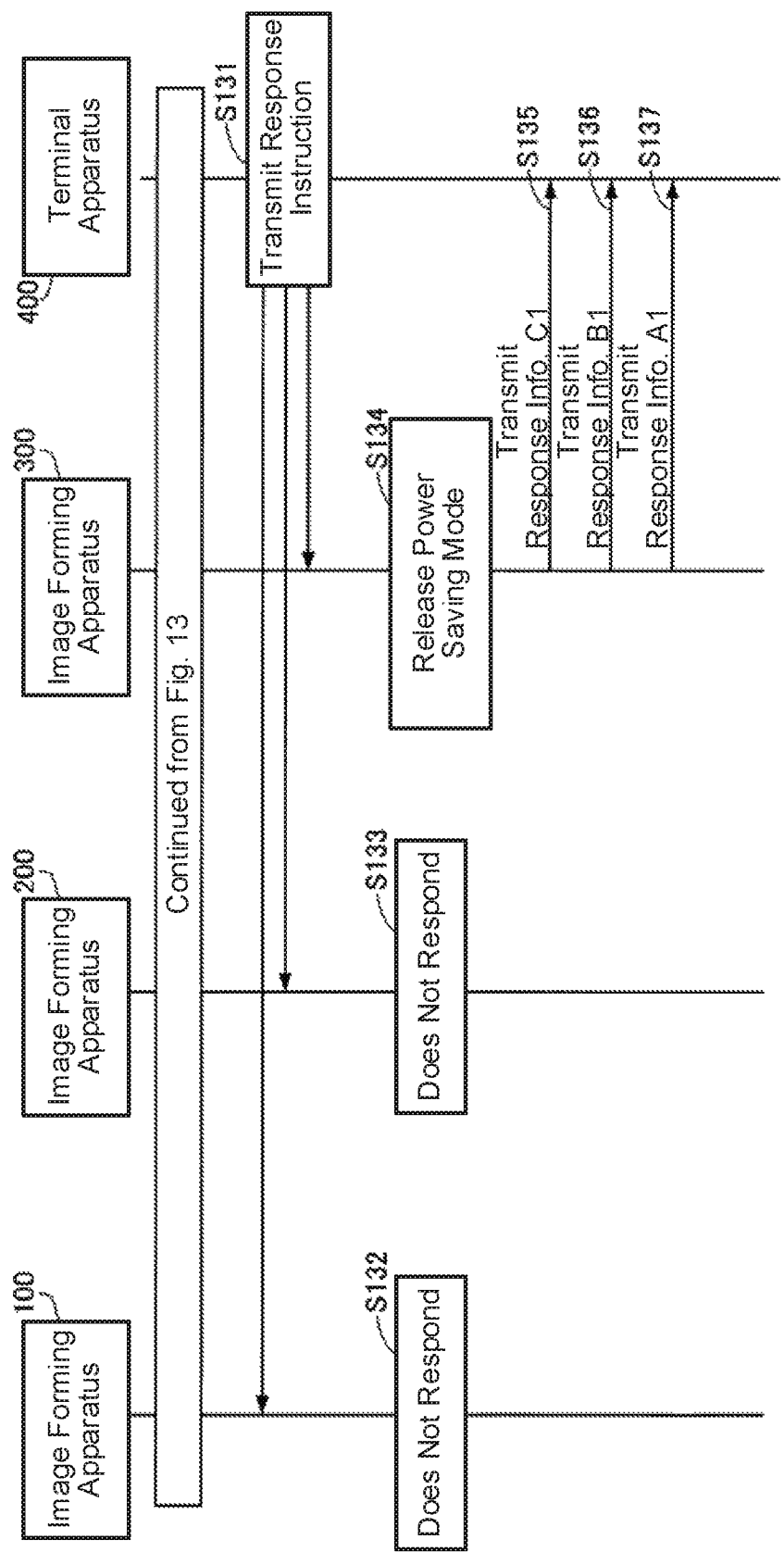
FIG. 14 is a part 4 of the sequence diagram illustrating the example of the transition process to the power saving mode.

FIG. 14 is a part 4 of the sequence diagram illustrating the example of the transition process to the power saving mode.

(Step S131) The terminal apparatus 400 transmits a transmission instruction to the image forming apparatuses 100, 200, 300 by multicasting. A multicast address is set for a destination address included in the transmission instruction.

(Step S132) The power saving handling part 170 of the image forming apparatus 100 refers to the control table 141 and detects that "invalid" is set. Therefore, the power saving handling part 170 of the image forming apparatus 100 does not respond to the transmission instruction. Further, the power saving handling part 170 of the image forming apparatus 100 does not release the power saving mode. Further, the power saving handling part 170 of the image forming apparatus 100 may discard the transmission instruction (that is, the command).

(Step S133) The power saving handling part 270 of the image forming apparatus 200 refers to the control table stored in the storage part 240 and detects that "invalid" is set. Therefore, the power saving handling part 270 of the image forming apparatus 200 does not respond to the transmission instruction. Further, the power saving handling part 270 of the image forming apparatus 200 does not release the power saving mode. Further, the power saving handling part 270 of the image forming apparatus 200 may discard the transmission instruction.

(Step S134) The power saving handling part 370 of the image forming apparatus 300 refers to the control table stored in the storage part 340 and detects that "valid" is set. Therefore, the power saving handling part 370 of the image forming apparatus 300 responds to the transmission instruction. The power saving handling part 370 of the image forming apparatus 300 executes a process to release the power saving mode. For example, the power saving handling part 370 instructs a power supply circuit (not illustrated in the drawings) of the image forming apparatus 300 to change the power supply destination to the control part 310 or the like. As a result, power is supplied to the control part 310 and the like. Then, the image formation apparatus 300 transitions to the release mode. In this way, when the image forming apparatus 300 is in the power saving mode and "valid" is set in the control table stored in the storage part 340, the image forming apparatus 300 releases the power saving mode.

(Step S135) The communication part 360 of the image forming apparatus 300 transmits a response with respect to the transmission instruction to the terminal apparatus 400. The response includes the response information C1 stored in the storage part 340. That is, the communication part 360 of the image forming apparatus 300 transmits the response information C1 to the terminal apparatus 400.

(Step S136) The image forming apparatus 300 responds to the transmission instruction on behalf of the image forming apparatus 200. The response includes the response information B1 stored in the storage part 340. That is, the communication part 360 of the image forming apparatus 300 transmits the response information B1 to the terminal apparatus 400.

(Step S137) The image forming apparatus 300 responds to the transmission instruction on behalf of the image forming apparatus 100. The response includes the response information A1 stored in the storage part 340. That is, the communication part 360 of the image forming apparatus 300 transmits the response information A1 to the terminal apparatus 400.

In this way, the image forming apparatus 300 responds to the transmission instruction on behalf of the image forming apparatuses 100, 200. Therefore, even when the terminal apparatus 400 transmits the transmission instruction, the image forming apparatuses 100, 200 do not have to release the power saving mode. Since image forming apparatuses 100, 200 do not release the power saving mode, power consumption can be suppressed. That the image forming apparatuses 100, 200 do not release the power saving mode can improve power saving of the entire communication system.

Further, the image forming apparatus that performs proxy is an apparatus that transitions to the power saving mode last among the image forming apparatuses belonging to the multicast group. Therefore, the image forming apparatuses belonging to the multicast group may transition to the power saving mode in any order.

Figure 15:
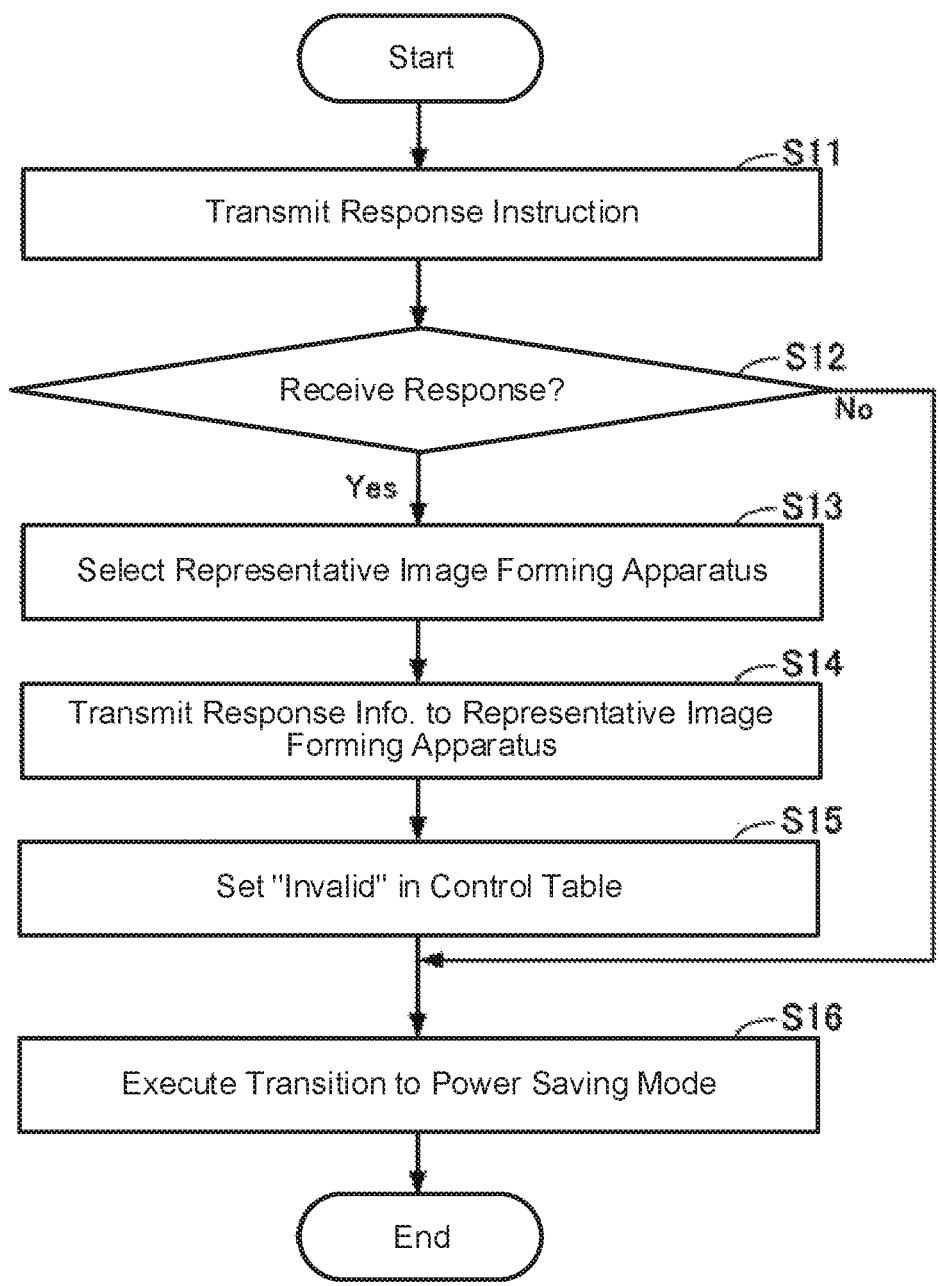
FIG. 15 is a flow diagram illustrating a transition process to the power saving mode.

Next, communication processes executed by the image forming apparatuses 100, 200, 300 are described using a flow diagram. Further, the processes illustrated in FIG. 15 are executed in the same way by the image forming apparatuses 100, 200, 300. Therefore, in FIG. 15, a case where the image formation apparatus 100 executes the processes is described, and descriptions of cases where the image formation apparatuses 200, 300 execute the processes are omitted.

FIG. 15 is a flow diagram illustrating a transition process to the power saving mode. In the description of FIG. 15, FIGS. 1, 3, 7, 8, and 11-13 are referenced. Further, it is assumed that the image forming apparatus 100 is in the release mode. It is assumed that "valid" is set in the control table 141.

(Step S11) The communication part 160 transmits a response instruction by multicasting.

(Step S12) The control part 110 determines whether or not a response with respect to the response instruction has been received. When a response with respect to the response instruction is received (Yes at Step S12), the control part 110 advances the process to Step S13. When a response with respect to the response instruction is not received (No at Step S12), the control part 110 advances the process to Step S16.

(Step S13) The control part 110 selects a representative image forming apparatus from image forming apparatuses that have transmitted responses.

(Step S14) The control part 110 transmits via the communication part 160 the response information A1 to the representative image forming apparatus. Further, when response information of each of other image forming apparatuses is stored in the storage part 140, the control part 110 transmits via the communication part 160 the response information of each of the other image forming apparatuses to the representative image forming apparatus. Further, the response information of each of the other image forming apparatuses may each be referred to as second response information.

(Step S15) The control part 110 sets "invalid" in the control table 141.

(Step S16) The control part 110 executes a process to transition to the power saving mode. In this way, since the representative image forming apparatus acts on behalf of the image forming apparatus 100, the image forming apparatus 100 does not have to release the power saving mode and respond to the transmission instruction. By not releasing the power saving mode, the image forming apparatus 100 can reduce the number of times the power saving mode is released.

In the embodiment, the case where the terminal apparatus 400 transmits a transmission instruction by multicasting has been described. However, the embodiment can also be applied to instructions other than the transmission instruction. For example, the terminal apparatus 400 transmits an update instruction of information stored in the image forming apparatuses 100, 200, 300 by multicasting. The image forming apparatus 300 transmits a completion response with respect to the update instruction to the terminal apparatus 400 on behalf of the image forming apparatuses 100, 200. As a result, the image forming apparatuses 100 and 200 do not have to release the power saving mode. The image forming apparatuses 100, 200 each update the information after the power saving mode is released.

Further, in the embodiment, the case where the terminal apparatus 400 transmits a command by multicasting has been described. However, the embodiment can also be applied to a case where the terminal apparatus 400 transmits a command by broadcasting. In the broadcasting, the transmission instruction does not need to include any node of the image forming apparatus to designate destinations. All of apparatus, which are connected to the network, are expected to receive a transmission instruction that is sent by broadcasting even if none of nodes is included therein. For example, the image forming apparatus 300 stores the response information A1, the response information B1, and the response information C1. The image forming apparatuses 100, 200 each set "invalid" in the control table so as not to respond even when the terminal apparatus 400 transmits a transmission instruction by broadcasting. When a transmission instruction transmitted by broadcasting by the terminal apparatus 400 is received, the image forming apparatus 300 responds to the transmission instruction on behalf of the image forming apparatuses 100, 200. That is, the image forming apparatus 300 transmits the response information A1 and the response information B1 to the terminal apparatus 400.

Next, a release process of the power saving mode is described using a sequence diagram. For example, the release process of the power saving mode is executed after FIG. 14. Further, the image forming apparatus 300 may perform the processes of FIG. 13 again and transitions to the power saving mode.

Figure 16:
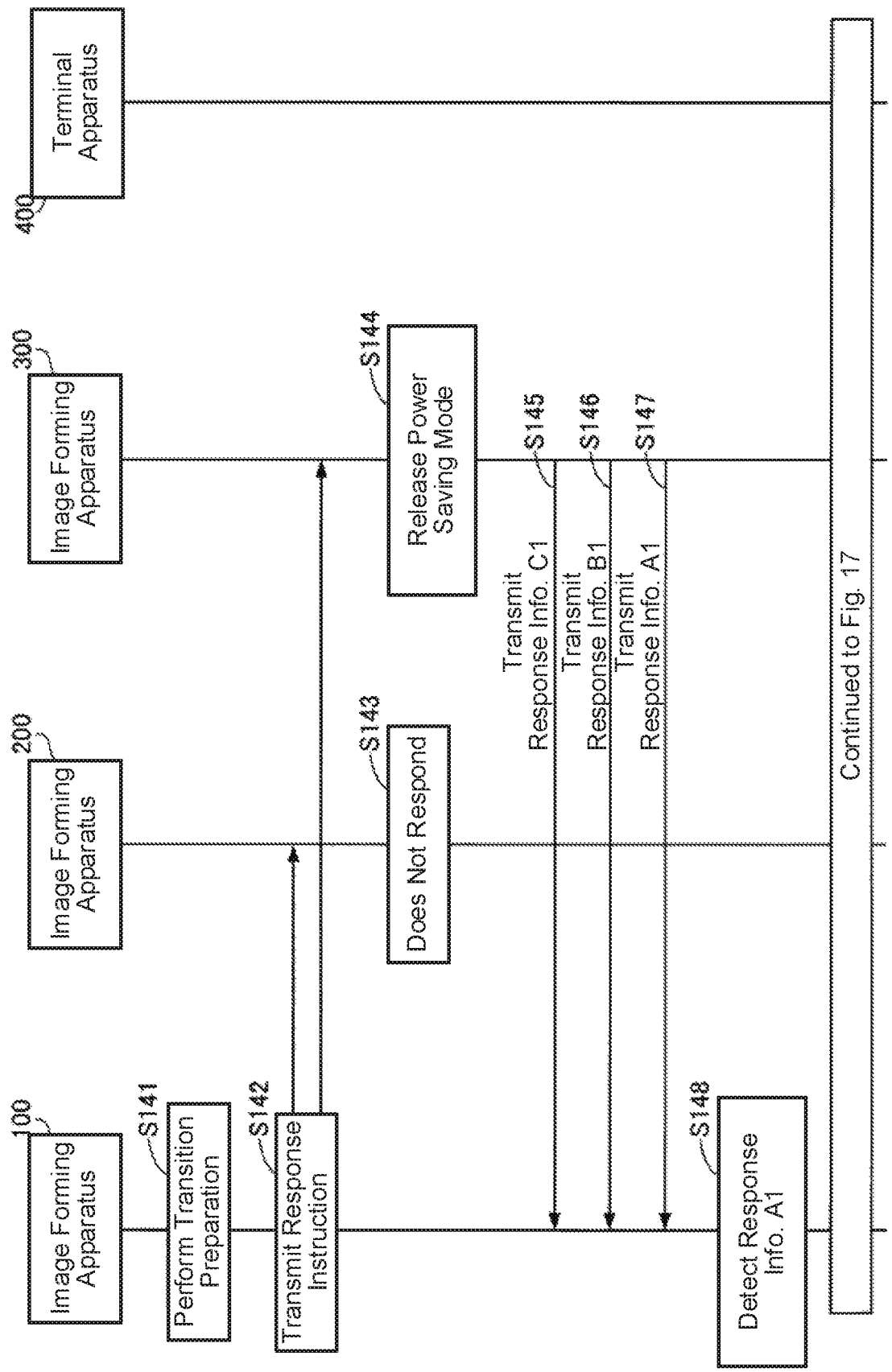
FIG. 16 is a part 1 of a sequence diagram illustrating an example of a release process of the power saving mode.

FIG. 16 is a part 1 of a sequence diagram illustrating an example of a release process of the power saving mode. In the description of FIGS. 16 and 17, FIGS. 1, 3-5 and 7 are referenced. Further, it is assumed that the image forming apparatuses 100, 200, 300 are in the power saving mode. It is assumed that "invalid" is set in the control tables of the image forming apparatuses 100, 200, 300. It is assumed that "valid" is set in the control table of the image forming apparatus 300. It is assumed that the image forming apparatus 300 stores the response information A1 and the response information B1.

(Step S141) The power saving handling part 170 of the image forming apparatus 100 performs transition preparation in order to transition to the release mode.

(Step S142) Before releasing the power saving mode, the power saving handling part 170 of the image forming apparatus 100 transmits a transmission instruction by multicasting in order to search for an image forming apparatus that stores the response information A1. The transmission instruction instructs transmission of the response information.

(Step S143) The power saving handling part 270 of the image forming apparatus 200 refers to the control table stored in the storage part 240 and detects that "invalid" is set. Therefore, the power saving handling part 270 of the image forming apparatus 200 does not respond to the transmission instruction. Further, the power saving handling part 270 of the image forming apparatus 200 does not release the power saving mode.

(Step S144) The power saving handling part 370 of the image forming apparatus 300 refers to the control table stored in the storage part 340 and detects that "valid" is set. The power saving handling part 370 of the image forming apparatus 300 executes a process to release the power saving mode. As a result, the image formation apparatus 300 transitions to the release mode.

(Step S145) The communication part 360 of the image forming apparatus 300 transmits a response with respect to the transmission instruction. The response includes the response information C1 stored in the storage part 340. That is, the communication part 360 of the image forming apparatus 300 transmits the response information C1 to the image forming apparatus 100.

(Step S146) The communication part 360 of the image forming apparatus 300 transmits a response with respect to the transmission instruction. The response includes the response information B1 stored in the storage part 340. That is, the communication part 360 of the image forming apparatus 300 transmits the response information B1 to the image forming apparatus 100.

(Step S147) The communication part 360 of the image forming apparatus 300 transmits a response with respect to the transmission instruction. The response includes the response information A1 stored in the storage part 340. That is, the communication part 360 of the image forming apparatus 300 transmits the response information A1 to the image forming apparatus 100.

(Step S148) The power saving handling part 170 of the image forming apparatus 100 detects that the response information A1 exists among the response information A1, the response information B1, and the response information C1 transmitted by the image forming apparatus 300. That is, the power saving handling part 170 of the image forming apparatus 100 detects that the apparatus information of the image forming apparatus 100 exists among the response information transmitted by the image forming apparatus 300. In this way, the power saving handling part 170 of the image forming apparatus 100 detects the image forming apparatus 300 that stores the response information A1 from the plurality of image forming apparatuses that receive the transmission instruction transmitted by multicasting by the apparatus 400.

Figure 17:
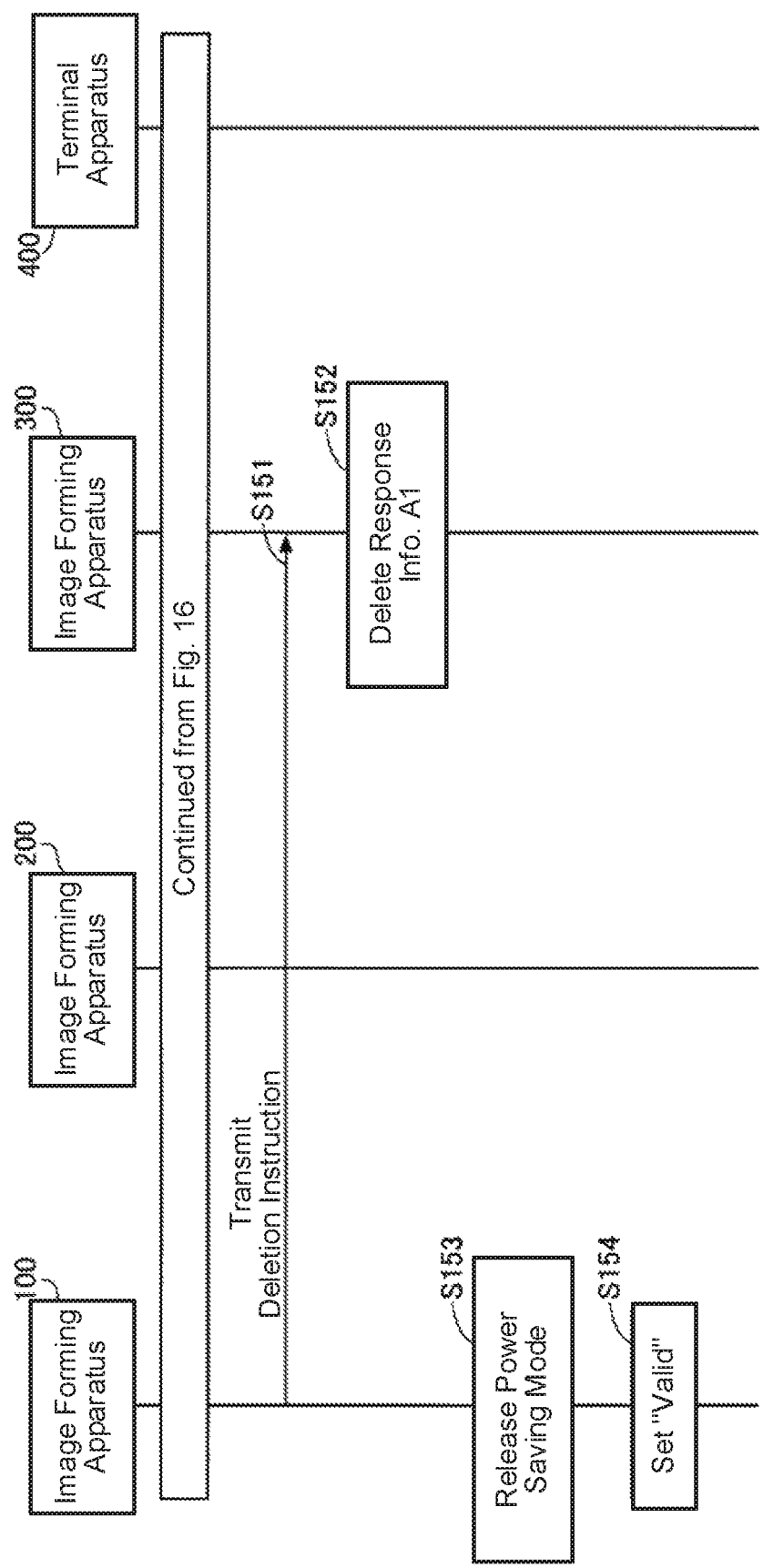
FIG. 17 is a part 2 of the sequence diagram illustrating the example of the release process of the power saving mode.

FIG. 17 is a part 2 of the sequence diagram illustrating the example of the release process of the power saving mode.

(Step S151) The power saving handling part 170 of the image forming apparatus 100 transmits a deletion instruction of the response information A1 to the image forming apparatus 300.

Figure 18:
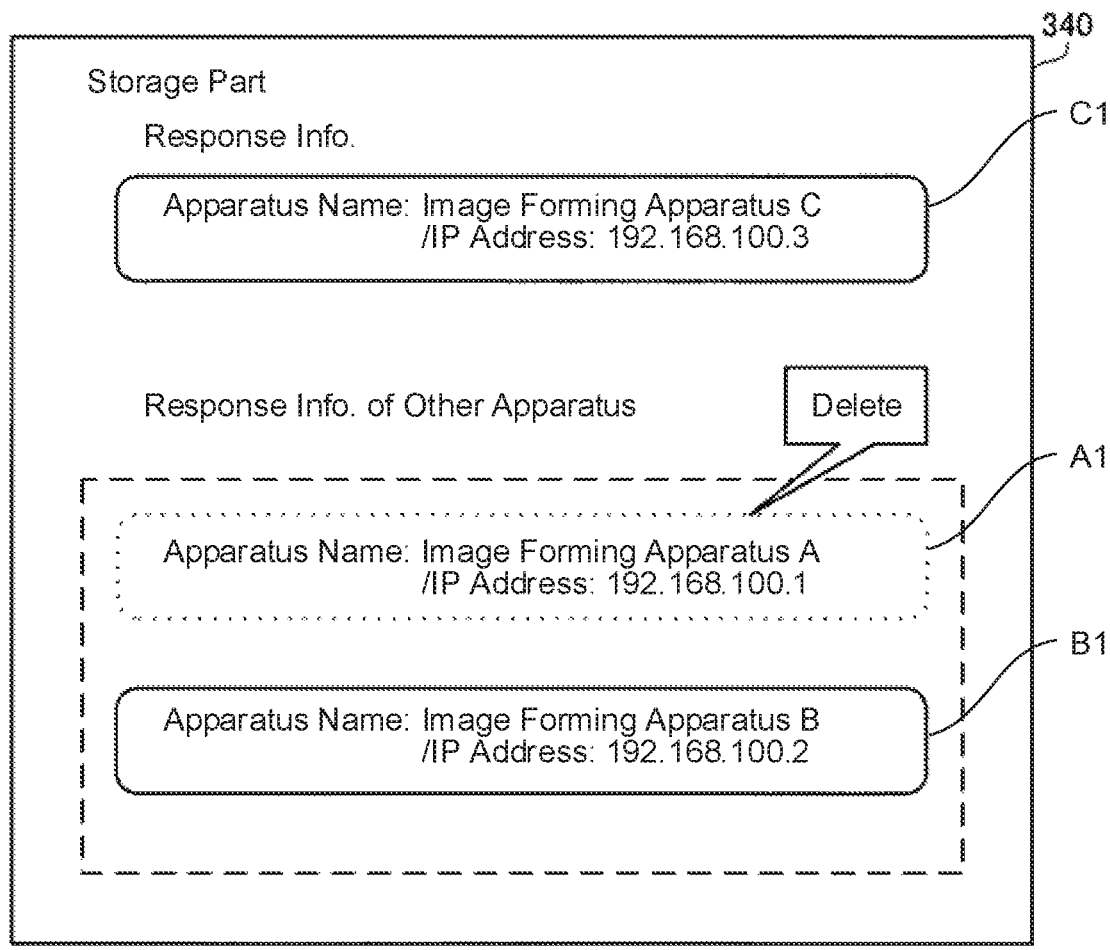
FIG. 18 illustrates a specific example of a case where response information is deleted.

(Step S152) The control part 310 of the image forming apparatus 300 deletes the response information A1 stored in the storage part 340. Here, FIG. 18 is described. FIG. 18 illustrates a specific example of a case where the response information is deleted. FIG. 18 illustrates that the response information A1 is deleted from the storage part 340.

Returning to the description of FIG. 17, (Step S153) the power saving handling part 170 of the image forming apparatus 100 executes a process to release the power saving mode. As a result, the image formation apparatus 100 transitions to the release mode.

(Step S154) The control part 110 of the image forming apparatus 100 sets "valid" in the control table 141.

Next, the release process of the power saving mode executed by each of the image forming apparatuses 100, 200, 300 is described using a flow diagram. Further, the processes illustrated in FIG. 19 are executed in the same way by the image forming apparatuses 100, 200, 300. Therefore, in FIG. 19, a case where the image formation apparatus 100 executes the processes is described, and descriptions of cases where the image formation apparatuses 200, 300 execute the processes are omitted.

FIG. 19 is a flow diagram illustrating a release process of the power saving mode. In the description of FIG. 19, FIGS. 1, 3, 7, 16, and 17 are referenced. Further, it is assumed that the image forming apparatus 100 is in the power saving mode. It is assumed that "invalid" is set in the control table 141.

(Step S21) The power saving handling part 170 transmits via the communication part 160 a transmission instruction by multicasting in order to search for an image forming apparatus that stores the response information A1.

(Step S22) The power saving handling part 170 determines whether or not a response with respect to the transmission instruction has been received. When a response with respect to the transmission instruction is received (Yes at Step S22), the power saving handling part 170 advances the process to Step S23. When a response with respect to the transmission instruction is not received (No at Step S22), the power saving handling part 170 advances the process to Step S25.

(Step S23) The power saving handling part 170 determines whether or not that the response information A1 exists among response information included in responses with respect to the transmission instruction has been detected. When that the response information A1 exists has been detected (Yes at Step S23), the power saving handling part 170 advances the process to Step S24. When that the response information A1 exists has not been detected (No at Step S23), the power saving handling part 170 advances the process to Step S25.

(Step S24) The power saving handling part 170 transmits via the communication part 160 a deletion instruction of the response information A1 to the image forming apparatus that transmitted the response information A1. That is, the power saving handling part 170 transmits a deletion instruction of the response information A1 to the representative image forming apparatus that responds on behalf of the image forming apparatus 100.

(Step S25) The power saving handling part 170 executes a process to release the power saving mode.

(Step S26) The control part 110 sets "valid" in the control table 141.

In this way, the image forming apparatus 100 causes the representative image forming apparatus to delete the response information A1. Then, the representative image forming apparatus stops responding on behalf of the image forming apparatus 100 by deleting the response information A1. Further, when a transmission instruction from the terminal apparatus 400 is received in the state of the release mode, the image forming apparatus 100 transmits a response including the response information A1 to the terminal apparatus 400. Therefore, even when the transmission instruction is transmitted by multicasting, the terminal apparatus 400 does not receive the response information A1 in duplicate.

Also, when the representative image forming apparatus can be identified, without executing Steps S21-S23, the power saving handling part 170 may transmit via the communication part 160 a deletion instruction of the response information A1 to the representative image forming apparatus. For example, before releasing the power saving mode, the power saving handling part 170 can identify the representative image forming apparatus by acquiring information indicating which image forming apparatus is the representative image forming apparatus from the image forming apparatus 200 or the image forming apparatus 300.

The embodiment is described using image forming apparatuses. However, the image forming apparatus 100, the image forming apparatus 200, or the image forming apparatus 300 may also be a PC (Personal Computer), a server, or a portable device such as a smart phone that can be put in a power saving mode. That is, the embodiment may also be applied to a PC, a server, or a portable device.

In the above embodiments, any image forming apparatus has a function to detect if a transmission instruction, which is delivered thereto, is sent either by multicasting or by unicasting. In a case where a transmission instruction sent by unicasting is delivered to an image forming apparatus, the apparatus is designed to switch the power mode from a power saving to release regardless of the status of the (proxy) response function. Namely, even if an image processing apparats is at a power saving mode with the response function "invalid," the image processing apparatus turns to a release mode when receiving a transmission instruction sent by unicasting. The detection for casting type can be embodied with software or hardware. Conventional network cards are available to practice the determination. In FIGS. 3-5, cast type detection parts 110a, 210a and 310a are illustrated, which execute the cast type detection.

In general, the multicasting might mean to transmit a signal or packet to several terminals, all of which are designed in a header of the packet. However, in the invention, the term may be construed as transmitting the signal/packet to more than one terminal.

What is claimed is:

1. An information processing apparatus that performs in either one of two different power modes that are a power saving mode and a release mode, the release mode being a state to which the power saving mode turns by being released and in which power consumption of the information processing apparatus is higher than that in the power saving mode, the information processing apparatus comprising:

a communication part that communicates with a first information processing apparatus, which is different from the information processing apparatus, and a terminal apparatus;

a storage part that stores first information which is information to be included in a response with respect to a command transmitted from the terminal apparatus by multicasting and received by the communication part; and a control part that sets a response function with respect to the command to either "valid" or "invalid" during the power saving mode, wherein the control part
transmits via the communication part the first information to the first information processing apparatus that performs a proxy response with respect to the command, and thereafter,
sets the response function to "invalid" and
executes a process to transit from the release mode to the power saving mode.

2. The information processing apparatus according to claim 1, further comprising:

the control part
transmits via the communication part a response instruction instructing a response to a plurality of other information processing apparatuses by multicasting, and
selects the first information processing apparatus from information processing apparatuses that have responded with respect to the response instruction.

3. The information processing apparatus according to claim 1, wherein, when the command transmitted by the terminal apparatus by multicasting is received by a second information processing apparatus, which is different from the first information processing apparatus or the information processing apparatus, and second information which is information to be included in a response of the second information processing apparatus with respect to the command is stored in the storage part, the control part transmits via the communication part the second information to the first information processing apparatus.

4. The information processing apparatus according to claim 1, wherein, when a response instruction instructing a response is transmitted via the communication part to a plurality of other information processing apparatuses by multicasting and there is no response with respect to the response instruction from the plurality of the other information processing apparatuses, the control part executes the process to transit from the release mode to the power saving mode while the response function remains being set to "valid".

5. The information processing apparatus according to claim 1 further comprising a power saving handling part, wherein before releasing the power saving mode, the power saving handling part transmits via the communication part a deletion instruction of the first information to an information processing apparatus that stores the first information.

6. The information processing apparatus according to claim 5, wherein, before releasing the power saving mode, the power saving handling part searches for the first information processing apparatus that stores the first information from the plurality of other information processing apparatuses that receive the command transmitted by the terminal apparatus by multicasting, and transmits the deletion instruction to the information processing apparatus that stores the first information.

7. The information processing apparatus according to claim 1, wherein the first information is apparatus information for identifying one of the information processing apparatuses that is in the power saving mode and of which the response function has been set "invalid".

8. The information processing apparatus according to claim 1, wherein in a case where the storage part stores
an ID information that identifies the first information processing apparatus, and
an instruction to perform for the first information processing apparatus, and,
where the information processing apparatus receives a command that is transmitted by multicasting designating at least the first information processing apparatus while the information processing apparatus is in the power saving mode and the response function is "valid," the control part
turns into the release mode and
executes the command for the first image processing apparatus.

9. The information processing apparatus according to claim 8, further comprising:

a cast type detection part that detects whether the command was transmitted by multicasting, which are designated to multiple nodes, or the command was transmitted by unicasting, which is designated to a single node, wherein in a case where the command that was transmitted by unicasting, which designates at the information processing apparatus, is delivered to the information processing apparatus, the control part turns into the release mode even if the response function is "invalid".

10. A communication control method executed by an information processing apparatus that performs in either one of two different power modes that are a power saving mode and a release mode, the release mode being a state to which the power saving mode turns by being released and in which power consumption of the information processing apparatus is higher than that in the power saving mode, the method comprising:

transmitting, to a first information processing apparatus that performs a proxy response with respect to a command transmitted by a terminal apparatus by multicasting, first information which is information to be included in a response with respect to the command, setting a response function with respect to the command to "invalid" in the power saving mode, and executing a process to transit from the release mode to the power saving mode.

11. A communication system comprising a plurality of information processing apparatuses that perform in either one of two different power modes that are a power saving mode and a release mode, the release mode being a state to which the power saving mode turns by being released and in which power consumption of the information processing apparatus is higher than that in the power saving mode, and at least a terminal apparatus, wherein each of the plurality of the information processing apparatuses includes:

a communication part that communicates with other information processing apparatuses and the terminal apparatus;

a storage part that stores first information which is information to be included in a response with respect to a command transmitted by the terminal apparatus by multicasting and received by the communication part; and a control part that sets a response function with respect to the command to "valid" or "invalid" in the power saving mode, and the control part transmits via the communication part the first information to one of the other information processing apparatuses that perform a proxy response with respect to the command, and thereafter, sets the response function to "invalid" and executes a process to transit from the release mode to the power saving mode.

* * * * *